United States Patent [19]
Cho

[11] Patent Number: 5,991,896
[45] Date of Patent: Nov. 23, 1999

[54] METHOD AND APPARATUS FOR PROTECTING AN ELECTRONIC SYSTEM FROM ERRONEOUS OPERATION DUE TO STATIC ELECTRICITY

[75] Inventor: Sung-Min Cho, Gumi, Rep. of Korea

[73] Assignee: SamSung Electronics Co., Ltd., Kyungki-do, Rep. of Korea

[21] Appl. No.: 08/899,809

[22] Filed: Jul. 24, 1997

[30] Foreign Application Priority Data

Jul. 24, 1996 [KR] Rep. of Korea ................. 1996 30088

[51] Int. Cl.$^6$ ................................................. G06F 11/00
[52] U.S. Cl. ................................................. 714/23; 714/55
[58] Field of Search .................. 395/550, 185.01; 355/208; 200/305; 714/48, 49, 50, 53, 54, 55, 57, 51, 52, 23

[56] References Cited

U.S. PATENT DOCUMENTS

| | | | |
|---|---|---|---|
| 3,935,508 | 1/1976 | Moister, Jr. ................................... | 317/2 |
| 4,492,820 | 1/1985 | Kennard et al. ........................ | 179/6.02 |
| 4,752,862 | 6/1988 | Takahashi et al. ....................... | 361/403 |
| 4,821,320 | 4/1989 | Andert et al. ............................ | 379/437 |
| 4,844,630 | 7/1989 | Hagen et al. ............................ | 400/521 |
| 4,879,575 | 11/1989 | Maruta et al. ........................... | 355/208 |
| 5,123,102 | 6/1992 | Puckette ................................... | 395/550 |
| 5,280,607 | 1/1994 | Bruck et al. .............................. | 714/55 |
| 5,345,583 | 9/1994 | Davis ........................................ | 714/55 |
| 5,401,926 | 3/1995 | Aoyama et al. ......................... | 200/305 |
| 5,412,495 | 5/1995 | Kim .......................................... | 359/88 |
| 5,421,006 | 5/1995 | Jablon et al. ............................. | 714/55 |
| 5,583,987 | 12/1996 | Kobayashi et al. ...................... | 714/13 |
| 5,608,488 | 3/1997 | Hirai et al. ............................... | 396/125 |

*Primary Examiner*—Joseph E. Palys
*Assistant Examiner*—Abu Hossain
*Attorney, Agent, or Firm*—Robert E. Bushnell, Esq.

[57] ABSTRACT

A technique for protecting an electronic system having a programmable input/output interface from erroneous operation due to static electricity includes the steps of: (a) setting an internal timer for continuously resetting a program state of the input/output interface at a predetermined time interval; (b) storing a present program state of the input/output interface after setting the timer; (c) resetting the stored program state of the input/output interface when a value of a driven timer corresponds to a value of the set timer after storing the present program state of the input/output interface; (d) repeatedly resetting the program state of the input/output interface by driving again the timer after resetting the program state of the input/output interface.

9 Claims, 2 Drawing Sheets

METHOD AND APPARATUS FOR PROTECTING AN ELECTRONIC SYSTEM FROM ERRONEOUS OPERATION DUE TO STATIC ELECTRICITY

CLAIM FOR PRIORITY

This application makes reference to, incorporates the same herein, and claims all benefits accruing under 35 U.S.C. §119 from an application for METHOD FOR THE PREVENTION OF ERRONEOUS OPERATION IN A SYSTEM DUE TO STATIC ELECTRICITY earlier filed in the Korean Industrial Property Office on the Jul. 24, 1996, and there duly assigned Ser. No. 30088/1996, a copy of which application is armexed hereto.

BACKGROUND OF THE INVENTION

1. Technical Field

The present invention generally relates to an electronic system having a programmable input/output interface, and more particularly, relates to a method for stably maintaining operation of such an electronic system against static electricity.

2. Related Art

Portable electronic systems such as hand held calculators, telephones, cameras, wristwatches, mini-computers, electronic typewriters, and those electronic devices that are not grounded but contain sensitive electronic, magnetic circuits and/or memories, are prone to erroneous operation due to static electricity.

Generally, there are many available techniques used to protect an electronic system from erroneous operation due to static electricity. These techniques typically include means to deflect or dissipate the electrostatic discharge emanating from the user to the system. For example, in U.S. Pat. No. 3,935,508 for High Voltage Discharge Switch For Protecting Sensitive Electronic Equipment And The Operators Thereof Moister, Jr. discloses an electronic system having a discharge switch formed of an electrically conductive material connected to a chassis of the electronic system for dissipating a charge of static electricity from the user. In U.S. Pat. No. 4,752,862 for Electronic Device, Takahashi et al., discloses a metal housing structure which is made of an insulating material for protecting an electronic system from erroneous operation due to static electricity. U.S. Pat. No. 4,821,320 for Device For Protecting Electrical Apparatus And The Operator When The Operator Carries A High Electrostatic Charge issued to Andert et al., provides a resistance path arranged to lead the electrostatic discharge from the user to a ground potential point of the electronic system. U.S. Pat. No. 4,844,630 for Method And Circuit Arrangement For Protection Of Typewriters Or Similar Machines Against Consequences Of Electrostatic Discharge issued to Hagen et al., discloses an electronic typewriter which uses a cover switch to reset operation of a microprocessor for operation protection against a consequence of an electrostatic discharge. U.S. Pat. No. 5,123,102 for Method And Apparatus For Suspending Computation Due To Detection Of Electrostatic Discharge issued to Puckette, discloses a digital hand held calculator which uses an edge detector for detecting a leading edge of an electrostatic discharge and an internal wait circuitry for suspending operation of a microprocessor for a predetermined time period before an electrostatic discharge can disturb operation of the microprocessor. U.S. Pat. No. 5,401,926 for Data Input Device With A Manually Operable Key Having Static Electricity Releasing Function issued to Aoyama et al., discloses an electronic system which uses a static electricity releasing circuit formed from a manually operable keytop of a keyboard to a ground in order to instantaneously release static electricity that has accumulated from the user to the ground.

While the contemporary electrostatic discharge techniques for modern electronic systems are valued, I have observed however, that a simpler technique for protecting an electronic system from erroneous operation due to static electricity can be contemplated.

SUMMARY OF THE INVENTION

Accordingly, it is therefore an object of the present invention to provide an electronic system having an programmable control section for providing immunity against static electricity.

It is also an object to provide a method for protecting an electronic system against erroneous operation due to static electricity emanating from the outside of the electronic system by resetting an operation state of an input/output interface at a predetermined time interval.

These and other objects of the present invention can be achieved by a method for protecting an electronic system having a programmable input/output interface from erroneous operation due to static electricity which includes the steps of: (a) setting an internal timer for continuously resetting a program state of the input/output interface at a predetermined time interval; (b) storing a present program state of the input/output interface after setting the internal timer; (c) resetting the stored program state of the input/output interface when a value of a driven timer corresponds to a value of the set timer by driving the timer after storing the present program state of the input/output interface; (d) repeatedly resetting the program state of the input/output interface by driving again the timer after resetting the program state of the input/output interface.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
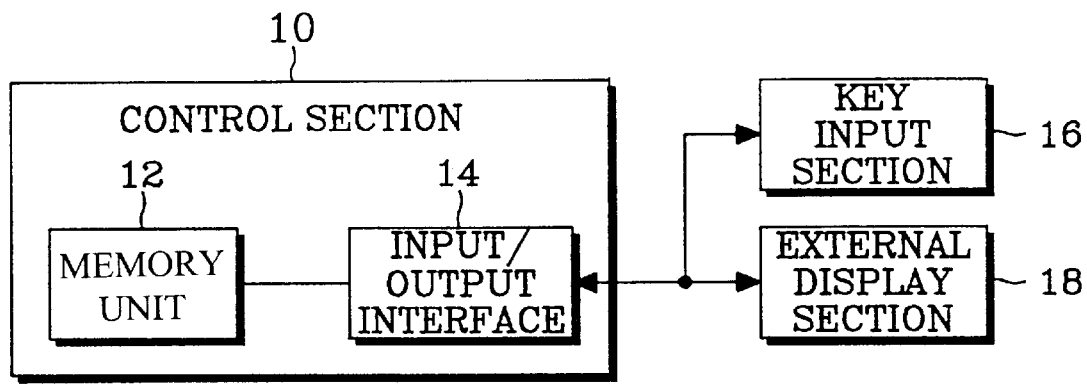
FIG. 1 is a block diagram of a contemporary electronic system having a typical input/output interface.

Referring now to the drawings and particularly to FIG. 1, which illustrates a contemporary electronic system including a control section 10, a key input section 16 and an external display section 18. As shown in FIG. 1, a control section 10 is a one-chip typed microprocessor which includes a memory unit 12 having a random-access-memory (RAM) and a read-only-memory (ROM) contained therein and a programmable input/output interface 14 for executing general control operation of the system. Thus, the control section 10 provides a visual display of information on the external display section 18 and processes a variety of key signals from the key input section 16 by controlling the input/output interface 14.

In such an electronic system, however, there has been a problem that the input/output interface 14 comprises a flip-flop, so that static electricity emanating from the user through the key input section 16 or the external display section 18 causes frequent erroneous operation in the system.

Figure 2:
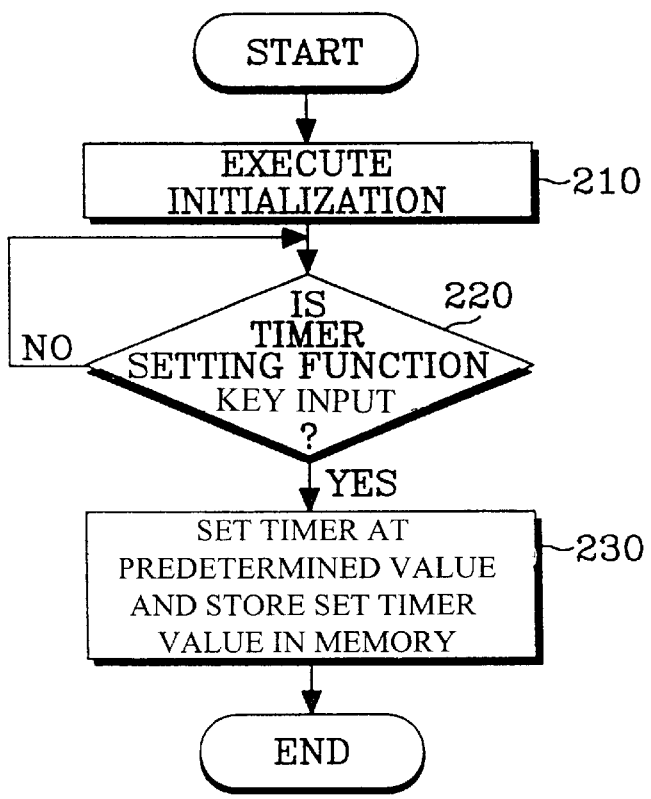
FIG. 2 is a flow chart of a process routine for setting a timer for resetting a program state of an input/output interface of an electronic system according to an embodiment of the present invention.
Figure 3:
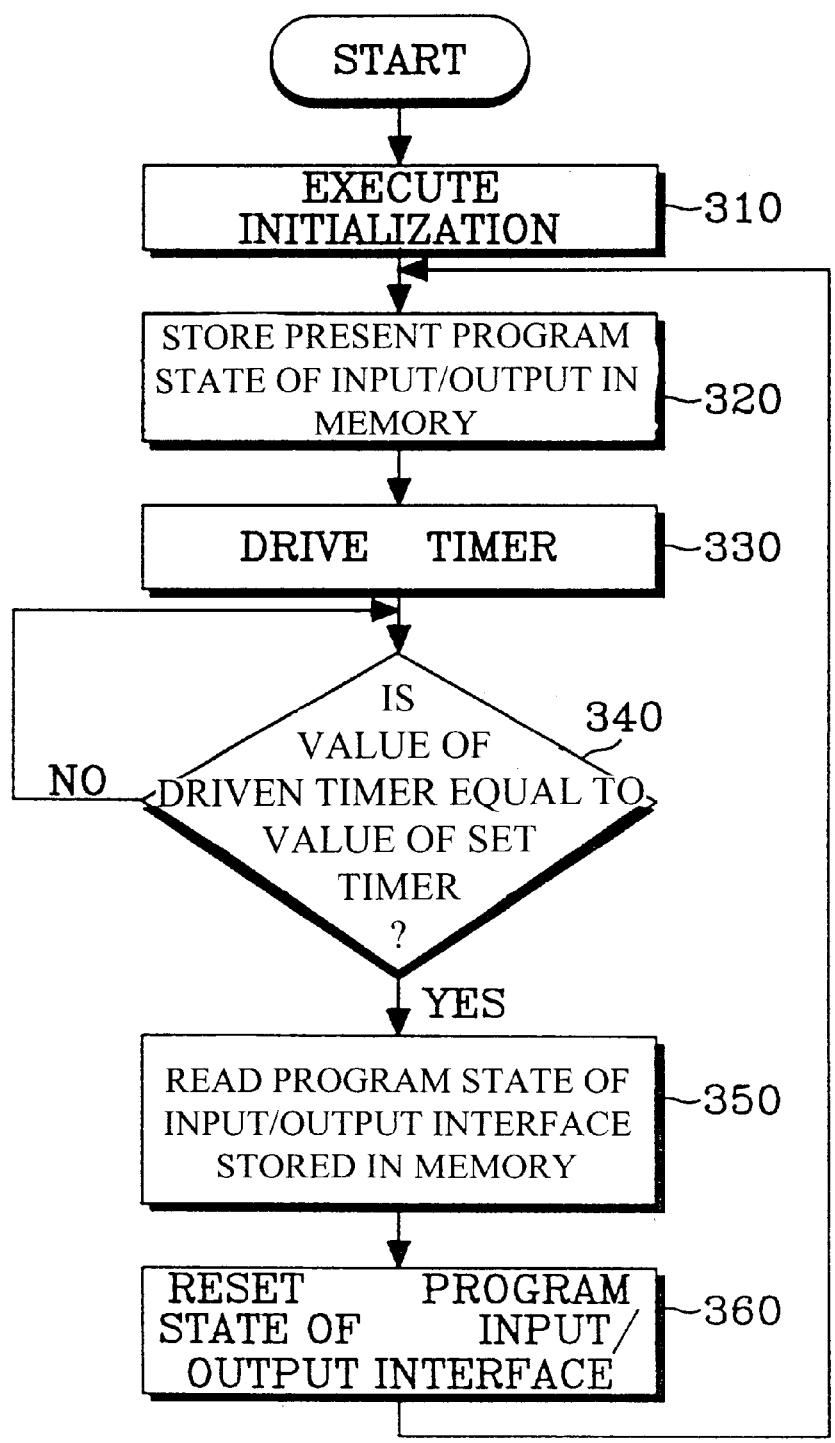
FIG. 3 is a flow chart of a process routine for protecting an electronic system from erroneous operation due to static electricity by resetting the program state of an input/output interface of the electronic system according to an embodiment of the present invention.

Turning now to FIGS. 2 and 3 which illustrate a process of protecting such an electronic system having a programmable input/output interface as shown in FIG. I from erroneous operation due to static electricity according to the principles of the present invention. FIG. 2 illustrates a process routine of setting an internal timer for resetting a program state of the input/output interface of an electronic system at a predetermined time interval. FIG. 3 then illustrates a process routine of resetting a program state of the input/output interface of an electronic system at the predetermined time interval set by the internal timer in order to protect such an electronic system from erroneous operation due to static electricity. Both setting and resetting routines constitute a program which can be stored in ROM of memory unit 12 of an electronic system as shown in FIG. 1 for protecting an electronic system from erroneous operation due to static electricity.

First, an example of the process of setting an internal timer for resetting the program state of an input/output interface at a predetermined time interval is set forth with reference to FIG.2. At step 210, the control section 10 executes an initialization of a timer setting routine of the system. Then, the control section 10 determines whether a timer setting function key for resetting a program state of the input/output interface 14 is input from the key input section 16 at step 220. At this time, if it is determined that the timer setting function key is input at step 220, the control section 10 sets, via instruction from the user, an internal timer at a value corresponding to a predetermined time interval and stores a set timer value memory unit 12. The set timer value is then used for resetting a program state of an input/output interface 14 in order to protect internal microprocessor from erroneous operation due to electrostatic discharge emanating from the user.

After the setting of an internal timer for resetting the program state of an input/output interface 14 at a predetermined time interval as described above, the control section 10 then executes an initialization of a reset routine at step 310 as shown in FIG. 3. At step 320, the control section 10 stores a program state of an operating input/output interface 14 in memory unit 12, preferably in its RAM. Then, the control section 10 drives an internal timer at step 330. After the internal timer is driven at step 330, the control section 10 determines whether or not a value of the driven timer is equal to the value of the set timer. At this time, if it is determined that the value of the driven timer is equal to the value of the set timer at step 340, the control section 10 proceeds to steps 350 and 360 to read the program state value of the input/output interface 14 stored in the memory 12 in order to reset the present program state of the input/output interface 14. After the program state of the input/output interface 14 is reset at step 360, the control section 10 returns to step 320 in order to repeat the resetting process at every predetermined time interval set by the internal timer.

As described above, the present invention advantageously provides a technique for protecting an electronic system from erroneous operation due to static electricity incoming from the outside through the connection of the input/output interface 14 by resetting a program state of the input/output interface 14 at a predetermined time interval, and thereby improving the reliability of a system. This is necessary because the static electricity incoming through the connection of the input/output interface 14 causes the input/output interface 14 to change the program state thereof. According to the present invention, the program state of the input/output interface 14 is stored in memory unit 12 and its information is read for resetting at every predetermined time interval. This way, the microprocessor and memory unit contained in the control section 10 can be made immune or insensitive to electrostatic discharge from the outside of the electronic system, and thereby protect such an electronic system from erroneous operation due to static electricity.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for protecting an electronic system from erroneous operation due to static electricity, said method comprising the steps of:

provideing a programmable input/output interface for said electronic system;

setting a timer for a set timer value, the set timer value for resetting a program state of said programmable input/output interface at intervals of a predetermined time;

storing a program state of said programmable input/output interface in a memory, driving said timer until a vale of said timer is equal to said set timer value; and resetting a present program state of said programmable input/output interface to the program state of said programmable input/output interface stored in said memory at each interval of said predetermined time when a value of the timer is driven to equal the set timer value to thereby protect said electronic system from erroneous operation due to static electricity wherein said electronic systems uses said programmable input/output interface to interface with at least one of a key input unit and a visual display unit, and said programmable input/output interface comprises a flip-flop for detecting static electricity emanating from at least one of the key input unit and the visual display unit.

2. An electronic system, comprising:

a control section including a microprocessor, a memory, and a programmable input/output interface, the control section for controlling operation of the electronic system;

a visual display unit electrically connected to the control section, via said programmable input/output interface;

a key input unit comprising a plurality of discrete keys including a timer setting function key that are independently operable by manual depression to provide to said microprocessor a plurality of unique input signals representing a plurality of different control functions, said key input unit being electrically connected to the control section, via said programmable input/output interface, for permitting a user to control operation of the electronic system; and wherein said control section protects said microprocessor from erroneous operation due to static electricity emanating from at least one of the key input unit and the visual display unit, via said programmable input/output interface, by the steps of:

determining whether the timer setting function key is input from the key input unit;

when the timer setting function key is input from the key input unit, setting an internal timer at a predetermined value and storing a set timer value in said memory, said set timer value for resetting a program state of said programmable input/output interface;

storing a program state of said programmable input/output interface in said memory;

driving the internal timer until a value of the internal timer reaches the set timer value stored in said memory; and reading the program state of said programmable input/output interface stored in said memory and resetting a present program state of said programmable input/output interface to the program state of said programmable input/output interface stored in said memory when the value of the internal timer driven reaches the set timer value stored in said memory.

3. The electronic system as claimed in claim 2, wherein said control section further repeatedly resets the present program state of said programmable input/output interface to the program state of said programmable input/output interface stored in said memory each time the value of the internal timer driven reaches the set timer value stored in said memory.

4. The electronic system as claimed in claim 3, wherein said programmable input/output interface comprises a flip-flop for detecting static electricity emanating from at least one of the key input unit and the visual display unit.

5. The electronic system as claimed in claim 2, wherein said programmable input/output interface comprises a flip-flop for detecting static electricity emanating from at least one of the key input unit and the visual display unit.

6. A method for protecting an electronic system from erroneous operation due to static electricity said method comprising the steps of:

providing a microprocessor and a memory for said electronic system;

providing a key input unit and a visual display unit for said electronic system;

providing a programmable input/output interface for said microprocessor and said memory of said electronic system, said programmable input/output interface being connected to said visual display unit and to said key input unit;

determining whether a timer setting function key is input from the key input unit;

when the timer setting function key is input from the key input unit, setting an internal timer at a predetermined value and storing a set timer value in said memory, said set timer value for resetting a program state of said programmable input/output interface;

storing a program state of said programmable input/output interface in said memory;

driving the internal timer until a value of the internal timer reaches the set timer value stored in said memory; and reading the program state of said programmable input/output interface stored in said memory and resetting a present program state of said programmable input/output interface to the program state of said programmable input/output interface stored in said memory when the value of the internal timer driven reaches the set timer value stored in said memory to thereby protect said electronic system from erroneous operation due to static electricity.

7. The method as claimed in claim 6, further comprising the step of repeatedly resetting the present program state of said programmable input/output interface to the program state of said programmable input/output interface stored in said memory each time the value of the internal timer driven reaches the set timer value stored in said memory.

8. The method as claimed in claim 7, wherein said programmable input/output interface comprises a flip-flop for detecting static electricity emanating from at least one of the key input unit and the visual display unit.

9. The method as claimed in claim 6, wherein said programmable input/output interface comprises a flip-flop for detecting static electricity emanating from at least one of the key input unit and the visual display unit.

* * * * *